United States Patent
Seo et al.

(10) Patent No.: US 9,680,225 B2
(45) Date of Patent: Jun. 13, 2017

(54) WIRELESS POWER RECEIVER AND TRANSFER, WIRELESS POWER TRANSCEIVER SYSTEM, AND WIRELESS POWER TRANSCEIVER MOBILE DEVICE

(71) Applicant: Soongsil University-Industry Cooperation Foundation, Seoul (KR)

(72) Inventors: Chul Hun Seo, Seoul (KR); Chongmin Lee, Seoul (KR)

(73) Assignee: SOONGSIL UNIVERSITY-INDUSTRY COOPERATION FOUNDATION, Seoul (KR)

( * ) Notice: Subject to any disclaimer, the term of this patent is extended or adjusted under 35 U.S.C. 154(b) by 743 days.

(21) Appl. No.: 13/974,306

(22) Filed: Aug. 23, 2013

(65) Prior Publication Data
US 2014/0062214 A1   Mar. 6, 2014

(30) Foreign Application Priority Data
Sep. 3, 2012  (KR) .................. 10-2012-0097330

(51) Int. Cl.
H01F 27/42 (2006.01)
H01F 37/00 (2006.01)
H01F 38/00 (2006.01)
H01Q 7/00 (2006.01)
H04B 5/00 (2006.01)
G02F 1/23 (2006.01)
G02F 1/00 (2006.01)
(Continued)

(52) U.S. Cl.
CPC .............. *H01Q 7/005* (2013.01); *G02F 1/00* (2013.01); *G02F 1/23* (2013.01); *H01Q 7/00* (2013.01);
(Continued)

(58) Field of Classification Search
CPC ... H02J 17/00; H02J 7/00; H01Q 1/38; H01Q 19/06; H01Q 15/08; B82Y 20/00
(Continued)

(56) References Cited

U.S. PATENT DOCUMENTS 4,274,083 A * 6/1981 Tomoeda ............. A01K 11/006
119/51.02
8,040,586 B2 * 10/2011 Smith .................... B82Y 20/00
330/4.9

(Continued)

FOREIGN PATENT DOCUMENTS

KR    10-2011-0121450 A    11/2011

OTHER PUBLICATIONS

Yuandan Dong et al., "Promising Future of Metamaterials", IEEE Microwave Magazine, vol. 13, Mar./Apr. 2012.
(Continued)

*Primary Examiner* — Rexford Barnie
*Assistant Examiner* — Jagdeep Dhillon
(74) *Attorney, Agent, or Firm* — Bacon & Thomas, PLLC

(57) ABSTRACT

A wireless power receiver includes a receiver resonator configured to be coupled to a source resonator to receive a power from the source resonator, the receiver resonator comprising: an inverted U-shaped dielectric layer whose distal ends are bent inward; an antenna patterned in the form of a loop in line with the shape of the dielectric layer; and a meta-structure arranged around the antenna on the dielectric layer, wherein the meta-structure is configured to reinforce at least one of the electric fields and magnetic fields that are formed in the receiver resonator.

19 Claims, 12 Drawing Sheets

(51) Int. Cl.
  *H04B 5/02* (2006.01)
  *H01Q 15/00* (2006.01)
(52) U.S. Cl.
  CPC ....... *H01Q 15/0086* (2013.01); *H04B 5/0037* (2013.01); *H04B 5/0081* (2013.01); *H04B 5/02* (2013.01)
(58) Field of Classification Search
  USPC .............. 307/104, 149, 82, 66, 64; 343/753, 343/700 MS, 846
  See application file for complete search history.

(56) References Cited

U.S. PATENT DOCUMENTS

| | | | | |
|---|---|---|---|---|
| 2007/0252646 A1* | 11/2007 | Leung | ................... | H03F 1/0266 330/136 |
| 2011/0133568 A1* | 6/2011 | Wang | ..................... | H02J 17/00 307/104 |
| 2011/0266879 A1* | 11/2011 | Kim | ........................ | H02J 17/00 307/104 |
| 2011/0267247 A1* | 11/2011 | Choi | ........................ | H01Q 7/00 343/753 |
| 2012/0235867 A1* | 9/2012 | Kim | ........................ | H01Q 1/38 343/700 MS |
| 2012/0293005 A1* | 11/2012 | Ryu | ....................... | B60L 11/182 307/104 |
| 2012/0306284 A1* | 12/2012 | Lee | ......................... | H02J 17/00 307/104 |

OTHER PUBLICATIONS

Christophe Caloz et al., "Electromagnetic Metamaterials: Transmission Line Theory and Microwave Applications".
Tatsuo Itoh et al., "Invited paper:Prospects for metamaterials", Electronics Letters, vol. 40, No. 16, Aug. 5, 2004.

* cited by examiner

WIRELESS POWER RECEIVER AND TRANSFER, WIRELESS POWER TRANSCEIVER SYSTEM, AND WIRELESS POWER TRANSCEIVER MOBILE DEVICE

RELATED APPLICATIONS

This application claims the benefit of Korean Patent Application No. 10-2012-0097330, filed on Sep. 3, 2012, which is hereby incorporated by reference as if fully set forth herein.

FIELD OF THE INVENTION

The present invention relates to a wireless power transceiver technology, and, more particularly, to a wireless power receiver and transfer, wireless power transceiver system, and wireless power mobile device adapted to raise wireless power transceiver efficiency.

BACKGROUND OF THE INVENTION

The rapid development of wireless communication technologies enables a new challenge to the application fields looked possible in virtual reality, and hence many of the application fields have been implemented and realized immediately accordingly.

Among others, most notable fields are U-City using USN (Ubiquitous Sensor Network), Femtocells that enable home networks, Robots that play the role of home helpers, unmanned aircraft that carry out emergency missions during the war operations, space solar generation that can be solved the energy of the future and the environmental issues, etc. In such application fields, information collected in each field is used to permit recognition, prevention and control of various matters.

However, the systems applied to these application fields have a capability of performing wireless communications, but they have still manifested the problem in terms of the energy supply and transfer. So, it cannot be said that the systems are a wireless system or a wireless communication system in the true sense. In addition, these systems have an extremely dominant problem in the life of the battery and fuel, an amount of energy that can be transferred in a wireless manner.

In addition, the electric toothbrushes, notebooks, Walkman, and the like have been adopted an inductance coupling technique by electromagnetic waves so-called an electromagnetic induction method. However, the inductance coupling technique by electromagnetic waves has a drawback that energy transfer efficiency deteriorates rapidly if the coupling coefficient of inductors is not high and hence wireless energy transfer is not possible when leaving a specific location.

Thus, in order to solve the problems such as low power, transfer distance, an amount of energy that can be transferred, lasting operational time, and the like, there has been developing magnetic resonance techniques that are similar to the electromagnetic induction method but are designed to concentrate the energy at a specific resonance frequency through the use of inductors and capacitors to transfer power in the form of magnetic energy.

In a wireless energy transfer structure using such magnetic resonance techniques has a merit that it can transfer the energy with relatively high power to several meters compared to the electromagnetic induction method. Nevertheless, it requires a high resonance characteristic, i.e., high quality factor.

On the other hand, meta-materials collectively refer to substances that are artificially synthesized to exhibit distinct electromagnetic properties that are not common in nature.

The radio waves in most materials are propagated in compliance with the right-hand rule of the vector fields E, H, and $\beta$, where E is an electric field, H is a magnetic field and $\beta$ is a wave vector. The direction of the phase velocity is the same as the direction of energy signal propagation (group velocity), and the refractive index is a positive number. The material having the above properties refers to as a Right Handed (RH) material. Most natural materials are RH materials. Artifacts are also the RH materials.

The meta-material has an artificial structure. When the meta-material is designed a structural average unit cell size 'p' much smaller than the wavelength of electromagnetic energy that is guided by the meta-material, the meta-material can behavior like as a homogeneous medium with respect to the electromagnetic energy being guided. Unlike the RH material, the meta-material may represent a negative refractive index in which the relative direction of the vector fields (E, H, $\beta$) becomes opposite to the direction of the energy propagation and phase velocity of signals that comply with the left-hand rule. The meta-material that supports only the negative refractive index is a Left Handed (LH) meta-material.

Many of the meta-materials are a mixture of the LH meta-materials and RH meta-materials and therefore, are a Composite Right and Left Handed (CRLH) meta-materials. A CRLH meta-material may exhibit a property of an RH meta-material at a high frequency and a property of an LH meta-material at the low-frequency. The design and attribute for the CRLH meta-materials are disclosed by Christophe Caloz and Tatsuo Itoh, "Electromagnetic Metamaterial: Transmission Line Theory and microwave applications" John Wiley & Sons, 2006. The CRLH meta-materials and their applications in antennas are disclosed by Tatsuo Itoh, "invited paper: Prospects for Metamaterials", E-Journal, Volume 40, No. 16, August 2004. Both of which are hereby incorporated by reference as if fully set forth herein.

The CRLH meta-materials may be organized and processed to represent the electromagnetic attributes, which are produced for special purposes, to use in applications where it is difficult or impractical or impossible to use other materials. Further, the CRLH meta-materials may also be used to develop new applications and organize new elements that are not possible with the RH meta-materials.

The applicant focused on the fact that the appliance of the wireless power transfer technology to meta-materials may lead to an improvement of the wireless power transfer efficiency. Of course, there exist some technologies in which the wireless power transfer technology is adopted to meta-materials, but it is hard for these technologies to enhance sufficiently the fields of electric and magnetic fields by raising the resonance characteristics of the wireless power resonator.

SUMMARY OF THE INVENTION

In view of the above, the present invention provides a wireless power transceiver technique capable of improving the Q factor of a wireless power transceiver to reinforce electric fields or magnetic fields, for example, amplify or focus the fields.

Further, the present invention provides a wireless power transceiver technique capable of securing wireless power transfer efficiency of at least 80% in a specific radio frequency band, for example, a 13.56 MHz frequency band used for an NFC (Near Field Communication) technique.

Further, the present invention provides a wireless power transceiver technique capable of implementing a size reduction of a wireless power transceiver mobile device.

In accordance with an embodiment of the present invention, there is provided a wireless power receiver, which includes: a receiver resonator configured to be coupled to a source resonator to receive a power from the source resonator, the receiver resonator comprising: an inverted U-shaped dielectric layer whose distal ends are bent inward; an antenna patterned in the form of a loop in line with the shape of the dielectric layer; and a meta-structure arranged around the antenna on the dielectric layer, wherein the meta-structure is configured to reinforce at least one of the electric fields and magnetic fields that are formed in the receiver resonator.

In the exemplary embodiment, wherein the meta-structure comprises one or more meta-pattern layers that are physically separated from the antenna.

In the exemplary embodiment, wherein the meta-structure has an effective dielectric constant of a positive value and an effective permeability of a negative value, and wherein the frequency band absorbed by the meta-structure 206 is different from the resonant frequency.

In the exemplary embodiment, wherein the meta-structure comprises a plurality of unit cells with a DHMR (Double H-shape Meta-material Resonator) structure.

In the exemplary embodiment, wherein the meta-structure has a Q factor of 100.

In accordance with another embodiment of the present invention, there is provided a wireless power receiver, which includes: a receiver resonator configured to be coupled to a source resonator to receive a power from the source resonator, the receiver resonator comprising: a first inverted U-shaped dielectric layer whose distal ends are bent inward; an antenna patterned in the form of a loop in line with the shape of the first dielectric layer; a first meta-structure arranged on the first dielectric layer around the antenna and configured to reinforce at least one of the electric fields and magnetic fields that are formed in the receiver resonator; a second inverted U-shaped dielectric layer located in the exterior of the first dielectric layer; and a second meta-structure arranged on the second dielectric layer and configured to reinforce at least one of the electric fields and magnetic fields that are formed in the receiver resonator.

In the exemplary embodiment, wherein the second meta-structure is arranged on the same plane as the first meta-structure.

In the exemplary embodiment, wherein the second meta-structure is configured to amplify any one of the electric fields and the magnetic fields that are formed in the receiver resonator.

In the exemplary embodiment, wherein the second meta-structure is perpendicular to the first meta-structure.

In the exemplary embodiment, wherein the second meta-structure is configured to focus any one of the electric fields and the magnetic fields that are formed in the receiver resonator.

In accordance with another embodiment of the present invention, there is provided a wireless power transfer, which includes: a source resonator configured to be coupled to a power supply, the source resonator comprising: an inverted U-shaped planar dielectric layer whose distal ends are bent inward; an antenna patterned in the form of a loop in line with the shape of the dielectric layer; and a meta-structure arranged around the antenna on the dielectric layer and configured to reinforce at least one of the electric fields and magnetic fields that are formed in the receiver resonator.

In the exemplary embodiment, the wireless power transfer further comprising: a VCO (Voltage Controlled Oscillator) configured to change a DC voltage for a control from the power supply to control an output oscillation frequency; and an amplifier configured to amplify an AC signal controlled by the VCO.

In the exemplary embodiment, wherein the amplifier comprises an adaptive bias circuit.

In the exemplary embodiment, wherein the adaptive bias circuit comprises means to receive information on the charge state from a receiver resonator to stop charging the power.

In accordance with another embodiment of the present invention, there is provided a wireless power transceiver device, which includes: a resonator configured to be coupled to a power supply or a resonator of an external wireless power transceiver device to transfer and receive to and from the external device, the resonator comprising: an inverted U-shaped dielectric layer whose distal ends are bent inward; an antenna patterned in the form of a loop in line with the shape of the dielectric layer; and a meta-structure arranged around of the antenna on the dielectric layer and configured to reinforce at least one of the electric fields and magnetic fields that are formed in the receiver resonator.

In the exemplary embodiment, wherein the meta-structure is physically separated from the antenna and comprises at least one or more meta-pattern layers that are patterned on the dielectric layer.

In the exemplary embodiment, wherein the meta-structure has an effective dielectric constant of a positive value and an effective permeability of a negative value, and wherein the frequency band absorbed by the meta-structure is different from the resonant frequency patterned on the dielectric layer.

In the exemplary embodiment, wherein the meta-structure comprises a plurality of unit cells with a DHMR (Double H-shape Meta-material Resonator) structure.

In the exemplary embodiment, wherein the meta-structure has a Q factor of 100.

In the exemplary embodiment, wherein the external wireless power transceiver device comprises: a transceiver circuit unit configured to convert DC voltage from the power supply and amplify the converted DC voltage; a receiver circuit unit configured to rectify the power received through the resonator; a switch unit configured to selectively switch the transfer circuit unit or the receiver circuit unit into the resonator; and a control unit configured to control the switch unit, receive the charge state information and stop charging the power.

As mentioned above, in accordance with an embodiment of the present invention, it is possible to reinforce the electric fields or magnetic fields through the improvement of the Q factor of the wireless power transceiver and secure the wireless power transfer efficiency of at least 80% in a 13.56 MHz frequency band used for the NFC. In addition, it is also possible to reduce the size of the wireless power transceiver mobile device while securing enough the wireless power transfer efficiency.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Before describing the embodiment of the present invention, it is noted that the embodiment invention applies the meta-structure to the technology of the wireless power transceiver and provides a technique of reinforcing the electric fields or magnetic fields through the improvement of the Q factor of the wireless power transceiver, securing the wireless power transfer efficiency of at least 80% in a 13.56 MHz frequency band used for the NFC, and achieving the size reduction of a wireless power transceiver mobile device, whereby the object of the present invention will be achieved easily from the technical idea.

Figure 1:
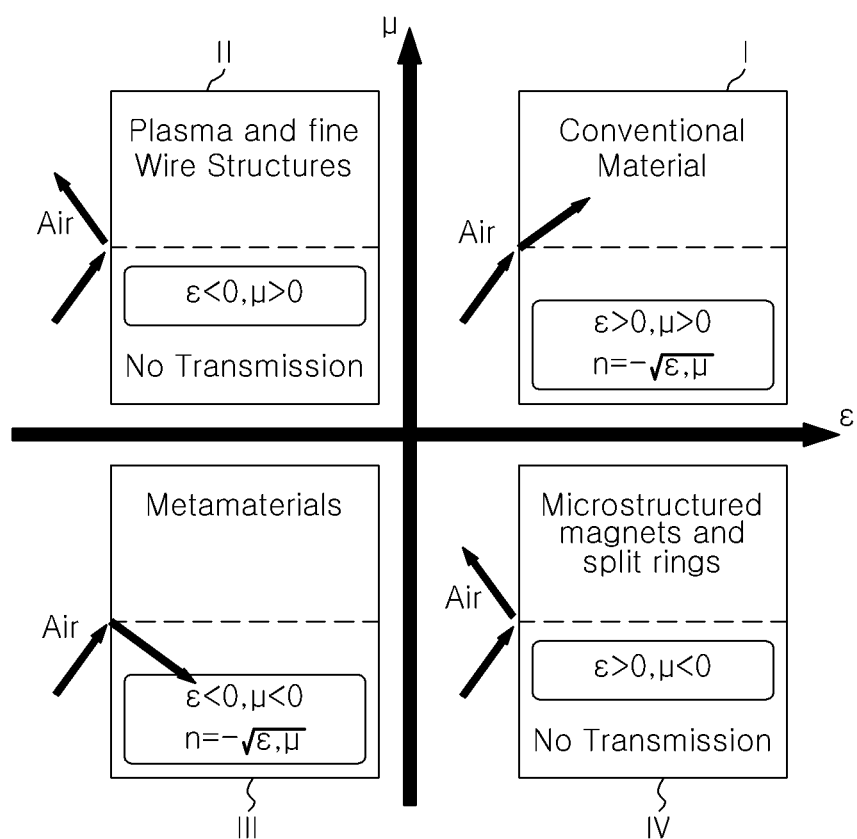
FIG. 1 is a diagram explaining a property of a meta-structure applicable to an embodiment of the present invention.

First, in terms of the meta-electromagnetic wave structure applied to the embodiments of the present invention, as shown in FIG. 1, most materials in the natural world are present in a first quadrant I and have positive values in both effective dielectric constant and effective permeability that show the properties of the materials. In a case where a radio wave is incident on a material present in one quadrant, the radio wave refracts and proceeds in compliance with the Snell's law.

For materials that are present in a second quadrant II, an effective dielectric constant has a negative value while the effective permeability has a positive value. These materials have a property that a radio wave incident on these materials is absorbed and vanished in accordance with the absorption the traveling distance of the radio wave without proceeding further.

Materials present in a third quadrant II have a property that both an effective dielectric constant and an effective permeability have a negative value. Further, a radio wave incident on these materials transmits at a particular frequency band, but it proceeds with a 180° phase difference between phase velocity and group velocity. Further, the materials exhibit that the radio wave is absorbed at the other frequency bands with the exception of the particular frequency band or vanished depending on the travelling distance of the radio wave.

For materials that are present in a fourth quadrant IV, an effective dielectric constant has a positive value while an effective permeability has a negative value. The materials typically include ferrites, etc. and have properties that a radio wave incident on these materials is transmitted and absorbed without further propagation or vanished depending on the traveling distance of the radio wave. Therefore, it is possible to design a material to get the same property of the materials present in the first, second, third and fourth quadrants in a specific frequency band. This is just such characteristic of the material, but is not such a material per se.

The meta-structure that is proposed in the embodiments of the present invention is intended to mean a structure designed to have a meta-radio wave property.

Hereinafter, the embodiments of the present invention will be described in detail with reference to the accompanying drawings.

Figure 2:
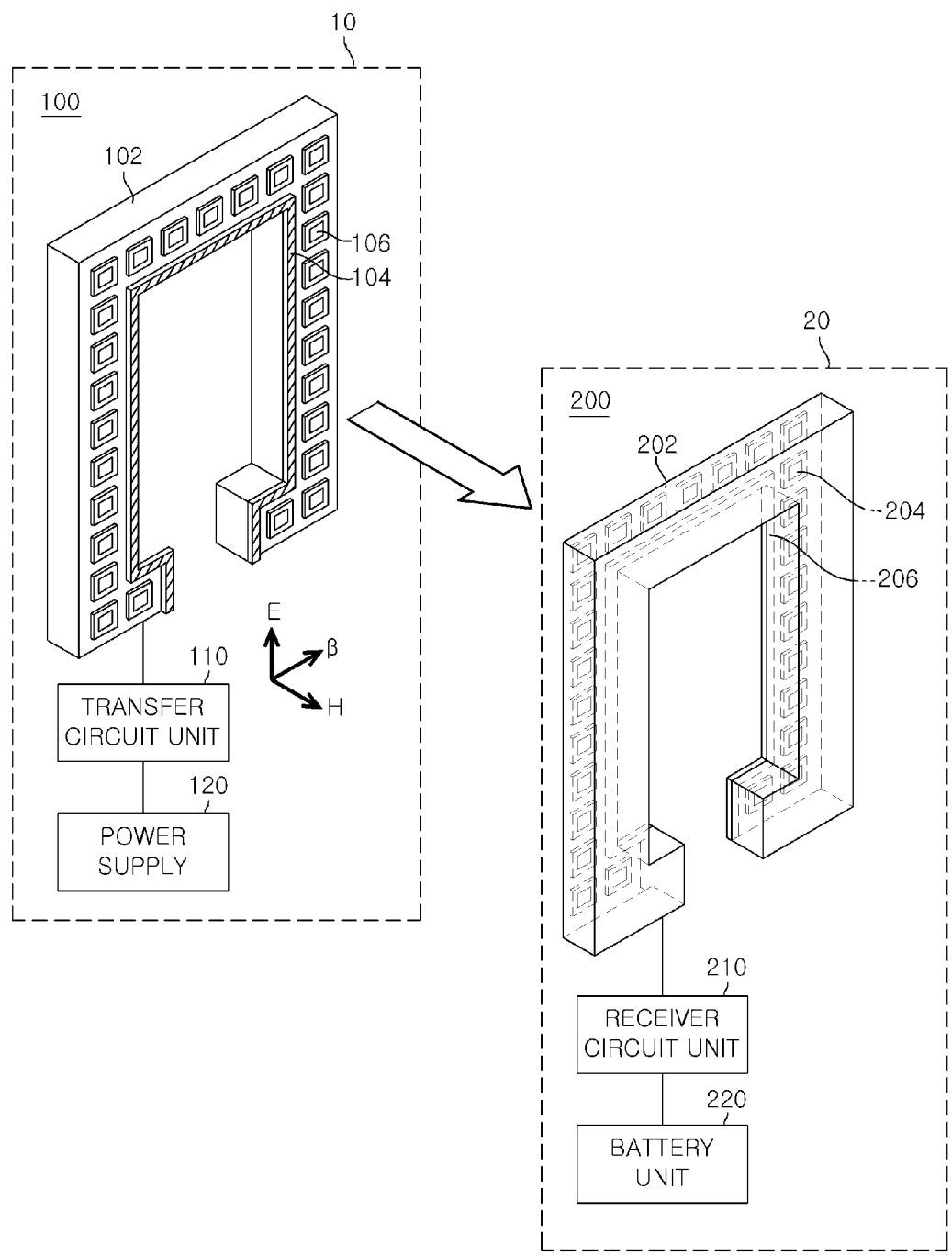
FIG. 2 is an overall configuration diagram of a wireless power transceiver system in accordance with an embodiment of the present invention.

FIG. 2 is an overall configuration diagram of a wireless power transceiver system in accordance with an embodiment of the present invention.

As illustrated in FIG. 2, the wireless power transceiver system generally includes a wireless power transfer 10 and a wireless power receiver 20. The wireless power transfer 10 is composed of a source resonator 100, a transfer circuit unit 110, and a power supply 120. The wireless power receiver 20 is composed of a receiver resonator 200, a receiver circuit unit 210, and a battery unit 220.

The source resonator 100, which may be coupled a power supply (not shown), includes an inverted U-shaped planar dielectric layer 102 of which distal ends are bent inward, a loop-shaped antenna 104 patterned in line with the inner shape of the dielectric layer 102, and a meta-structure 106 that is arranged around the antenna 104 on the dielectric layer 102 and is configured to reinforce at least one of electric fields and magnetic fields that are formed in the source resonator 100.

The meta-structure 106, which is applied to the embodiment of the present invention, is physically separated from the antenna 104, and may include one or more meta-pattern layers patterned on the dielectric layer 102, e.g., an array of unit cells with a DHMR (Double H-shape Meta-material Resonator) structure. In this example, it is characterized in that the meta-structure 106 has a Q factor of 100.

Such a meta-structure 106 has an effective dielectric constant $\in$ of a positive value and an effective permeability $\mu$ of a negative value, and in this condition, it is characterized in that the frequency band absorbed by the meta-structure 106 is different from the resonant frequency.

The transfer circuit unit 110 may include a VCO (Voltage Controlled Oscillator) (not shown) that changes a DC controlled voltage from a power supply to control an output oscillation frequency and an amplifier (not shown) that amplifies an AC signal controlled through the use of the VCO.

The amplifier includes, for example, an adaptive bias circuit, which in turn receives information on a charge state from the receiver resonator 200 to stop charging the power.

The power supply 120 feeds a power to the wireless power transfer 10.

In FIG. 2, a direction 'E' around the source resonator 100 represents a direction of the electric fields; a direction 'H' represents the magnetic fields; and a direction 'β' represents a wave vector.

Meanwhile, the receiver resonator 200 is coupled to the source resonator 100 to receive the power from the source resonator 100. The receiver resonator 200 includes an inverted U-shaped dielectric layer 202 whose distal ends are bent inward, a loop-shaped antenna 204 patterned in line with the inner shape of the dielectric layer 102, and the meta-structure 206 that is arranged around the antenna 204 on the dielectric layer 102 and is configured to reinforce at least one of the electric fields and magnetic fields that are formed in the receiver resonator 200.

The meta-structure 206, which is applied to the embodiment of the present invention, is physically separated from the antenna 204, and may include one or more meta-pattern layers patterned on the dielectric layer 202, e.g., an array of unit cells with a DHMR (Double H-shape Meta-material Resonator) structure. In this example, it is characterized in that the meta-structure 206 has a Q factor of 100.

Such a meta-structure 206 has an effective dielectric constant $\in$ of a positive value and an effective permeability $\mu$ of a negative value, and in this condition, it is characterized in that the frequency band absorbed by the meta-structure 206 is different from the resonant frequency.

The receiver circuit unit 210 may include a rectifier (not shown) that rectifies the power received through the receiver resonator 200 and a DC-DC converter (not shown) that converts an input of a rectified DC voltage from the rectifier into a DC voltage.

The battery unit 220 serves to charge a power converted through the DC-DC converter.

Continued referring to FIG. 2, the wireless power receiver 20 is adapted to monitor its own charge state and delivery the charge state information to the source resonator 100. The charge state information may be forwarded, for example, using a near field communication such as a Bluetooth technique.

Further, the wireless power receiver 20 is adapted to stop receiving the power from the source resonator 100 in accordance with the charge state of the receiver resonator 200. To accomplish it, any additional controller may be furnished in the wireless power receiver 20.

In the wireless power transceiver system provided with the wireless power transfer 10 and the wireless power receiver 20, the meta-structure is applied to both the source resonator 100 and the receiver resonator 200, which results in improving a Q factor of the wireless power transceiver apparatus to reinforce the electric fields or the magnetic fields, securing a wireless power transfer efficiency of 80%, and reducing the size of the wireless power transceiver system.

Figure 3:
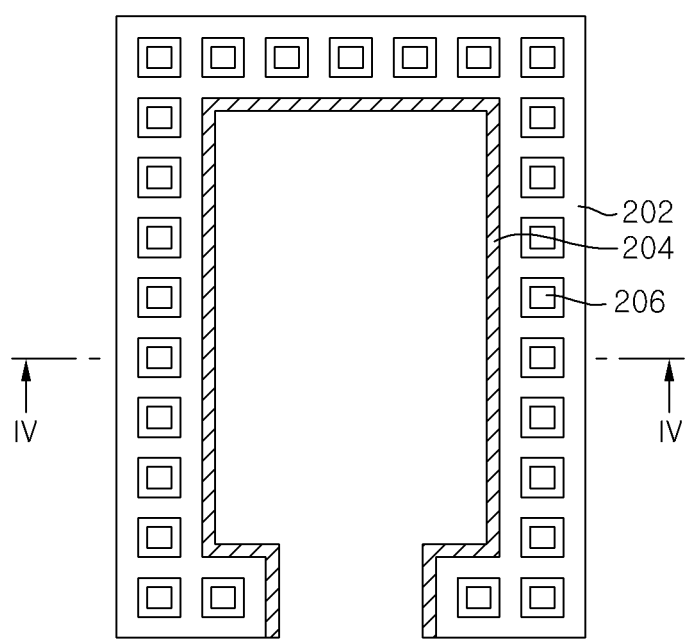
FIG. 3 show a plan view of an example of a receiver resonator (or a source resonator) applicable to a wireless power receiver (or a wireless power transfer) in accordance with an embodiment of the present invention.
Figure 4:
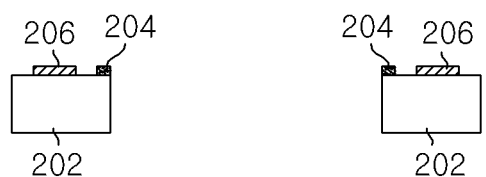
FIG. 4 is a sectional view of the receiver resonator (or the source resonator) shown in FIG. 3 taken along a line IV-IV.
Figure 5:
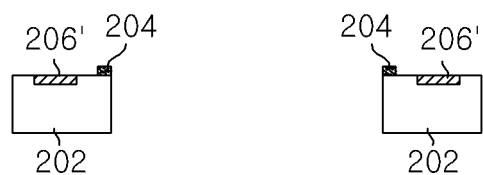
FIG. 5 is a sectional view of a modified example of the receiver resonator (or the source resonator) shown in FIG. 4.

FIG. 3 is a plan view of the receiver resonator 200 applied to the wireless power receiver 20 in accordance with an embodiment of the present invention, and FIGS. 4 and 5 are sectional views of the receiver resonator 200 of FIG. 3.

As illustrated in FIG. 3, the antenna 204 is formed in the form of a loop in line with the inverted U-shape of the dielectric layer 202. In addition, the meta-structure 206 is formed around the antenna 204 on the front surface of the dielectric layer 202.

FIG. 4 shows a sectional view of an example of the receiver resonator 200. In this example, the meta-structure 206 is patterned on the dielectric layer 202 in an embossed form.

FIG. 5 shows a sectional view of a modified example of the receiver resonator 200. In this example, the meta-structure 206' is patterned on the dielectric layer 202 in an engraved form.

While only the receiver resonator 200 of the wireless power receiver 20 is depicted in FIGS. 3 to 5 for the sake of explanation, it will be readily appreciated to those having an ordinary skill in the art that the same antennas, meta-structures and others as illustrated in FIGS. 3 to 5 may also be applied to the source resonator 100 of the wireless power transfer 10.

Figure 6:
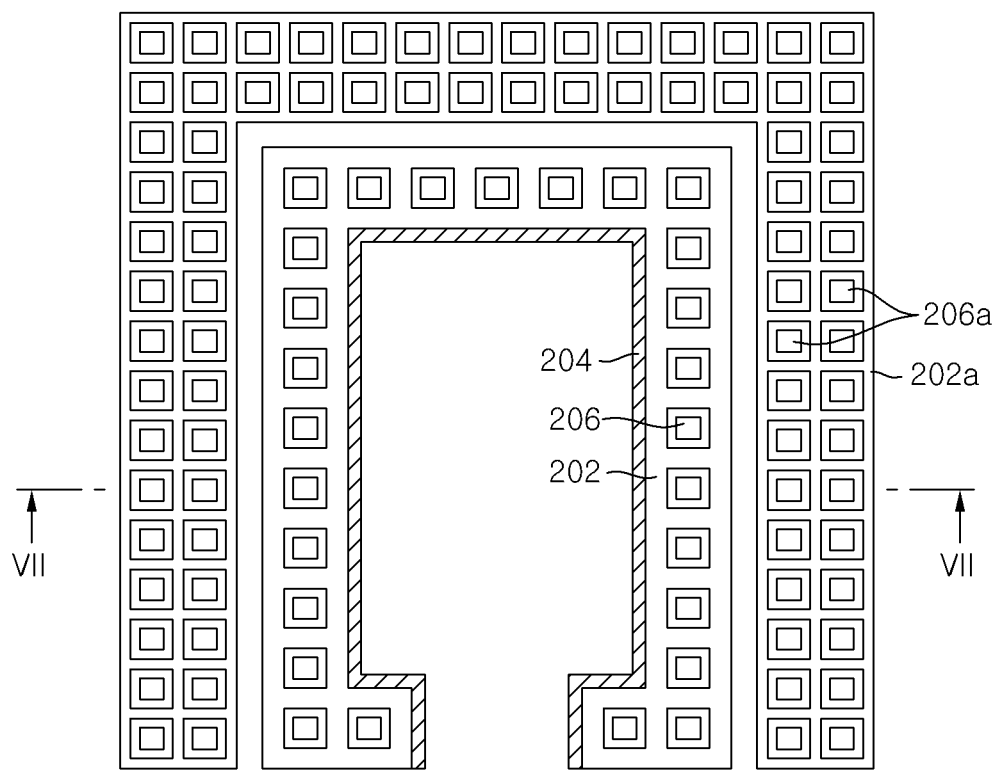
FIG. 6 show a plan view of another example of a receiver resonator (or a source resonator) applicable to a wireless power receiver (or transfer) in accordance with an embodiment of the present invention, wherein a first and second meta-structures are located on the same plane.
Figure 7:
FIG. 7 is a sectional view of the receiver resonator (or the source resonator) shown in FIG. 5 taken along a line VII-VII.

FIG. 6 is a plan view of another example of the receiver resonator 200 applicable to the wireless power receiver 20 in accordance with an embodiment of the present invention; FIG. 7 is a sectional view of the receiver resonator 200 of FIG. 6 taken along a line VII-VII; and FIG. 8 is a perspective view of the receiver resonator (or the source resonator) shown in FIG. 6.

The receiver resonator 200 as illustrated in FIG. 6 includes a first planar dielectric layer 202 having an inverted U-shape of which distal ends are bent inward, a loop-shaped antenna 204 patterned in line with the inner shape of the first dielectric layer 202, a first meta-structure 206 that is arranged around the antenna 204 on the first dielectric layer 202 and reinforces at least one of the electric fields and magnetic fields that are formed in the receiver resonator 200. The receiver resonator 200 also includes a second inverted U-shaped dielectric layer 202a that is located in the exterior of the first dielectric layer 202 while enclosing the first dielectric layer 202 and a second meta-structure 206a that are arranged on the second dielectric layer 202a and reinforces at least one of the electric fields and magnetic fields that are formed in the receiver resonator 200.

In this example, it is characterized in that the first and second meta-structures 206 and 206a are located on the same plane and the second meta-structure 206a amplifies any one of the electric fields and the magnetic fields that formed in the receiver resonator 200.

Figure 8:
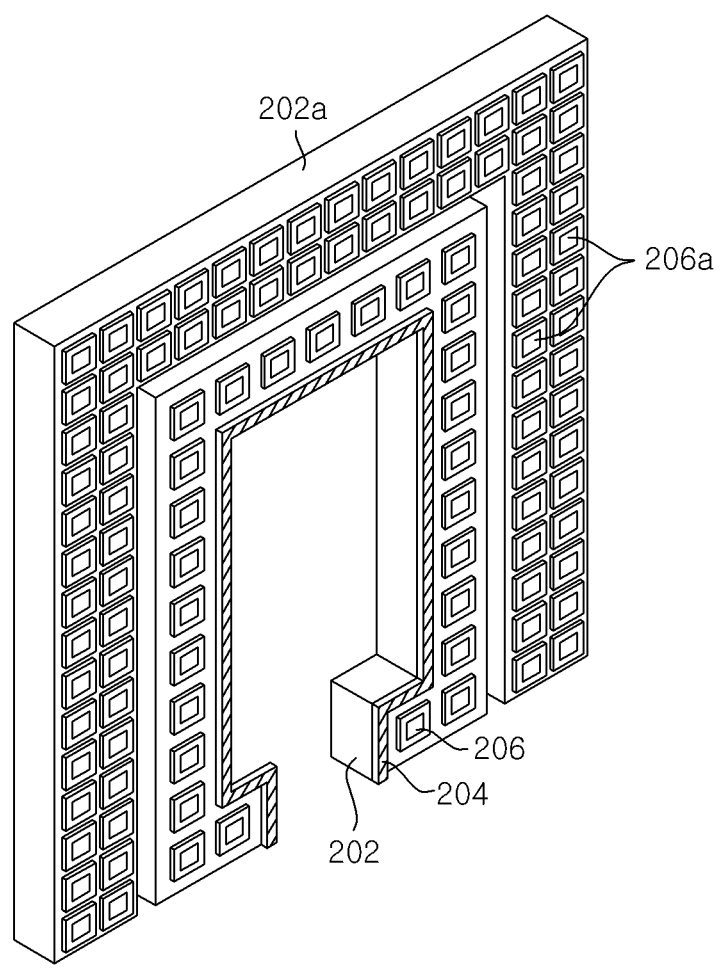
FIG. 8 is a perspective view of the receiver resonator (or the source resonator) shown in FIG. 6.

While only the receiver resonator 200 of the wireless power receiver 20 is depicted in FIGS. 6 to 8 for the sake of explanation, and it will be readily appreciated to those having an ordinary skill in the art that the same dielectric layers, meta-structures and others as illustrated in FIGS. 6 to 8 may also be applied to the source resonator 100 of the wireless power transfer 10.

Figure 9:
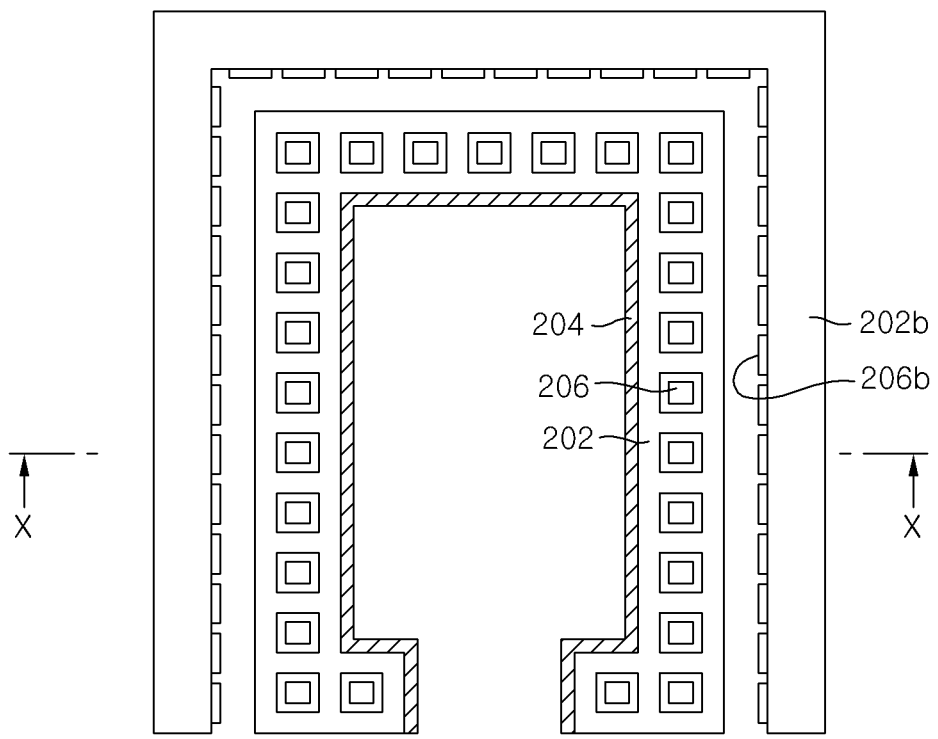
FIG. 9 show a plan view of further another example of a receiver resonator (or a source resonator) applicable to a wireless power receiver (or a wireless power transfer) in accordance with an embodiment of the present invention, wherein a first and second meta-structures are perpendicular to each other.
Figure 10:
FIG. 10 is a sectional view of the receiver resonator (or the source resonator) shown in FIG. 9 taken along a line X-X.

FIG. 9 is a plan view of another example of the receiving resonator 200 applicable to the wireless power receiver 20 in accordance with an embodiment of the present invention; FIG. 10 is a sectional view of the receiving resonator 200 of FIG. 9 taken along a line X-X; and FIG. 11 is a perspective view of the receiving resonator of FIG. 9.

The receiver resonator 200 as illustrated in FIG. 9 includes a first U-shaped dielectric layer 202 whose distal ends are bent inward, a loop-shaped antenna 204 patterned in line with the inner shape of the first dielectric layer 202, a first meta-structure 206 that is arranged around in the exterior of the antenna 204 and reinforces at least one of the electric fields and magnetic fields that are formed in the receiver resonator 200. The receiver resonator 200 also includes a second inverted-U shaped dielectric layer 202b arranged perpendicularly in the exterior of the first dielectric layer 202 while enclosing the first dielectric layer 202 and a second meta-structure 206b that is arranged on the second dielectric layer 202b and reinforces at least one of the electric fields and magnetic fields that are formed in the receiver resonator 200.

In this example, it is characterized in that the first and second meta-structures 206 and 206b are perpendicular to each other and the second meta-structure 206b focuses any one of the electric fields and the magnetic fields that formed in the receiver resonator 200.

Figure 11:
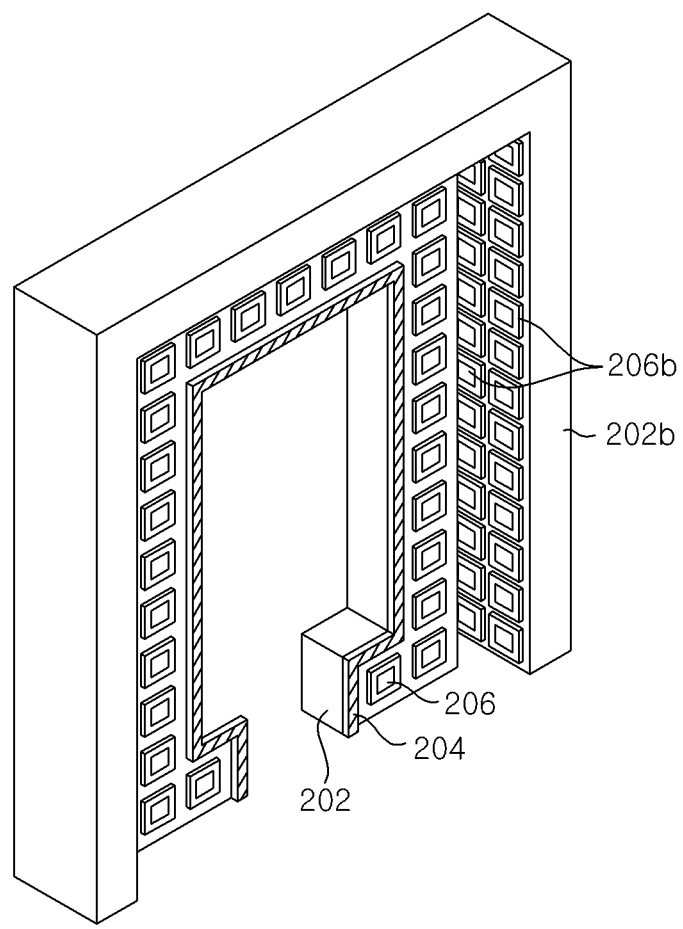
FIG. 11 is a perspective view of the receiver resonator (or the source resonator) shown in FIG. 10.

While only the receiver resonator 200 of the wireless power receiver 20 is depicted in FIGS. 9 to 11 for the sake of explanation, it will be readily appreciated to those having an ordinary skill in the art that the same dielectric layers, meta-structures and others as illustrated in FIGS. 9 to 11 may also be applied to the source resonator 100 of the wireless power transfer 10.

Figure 12:
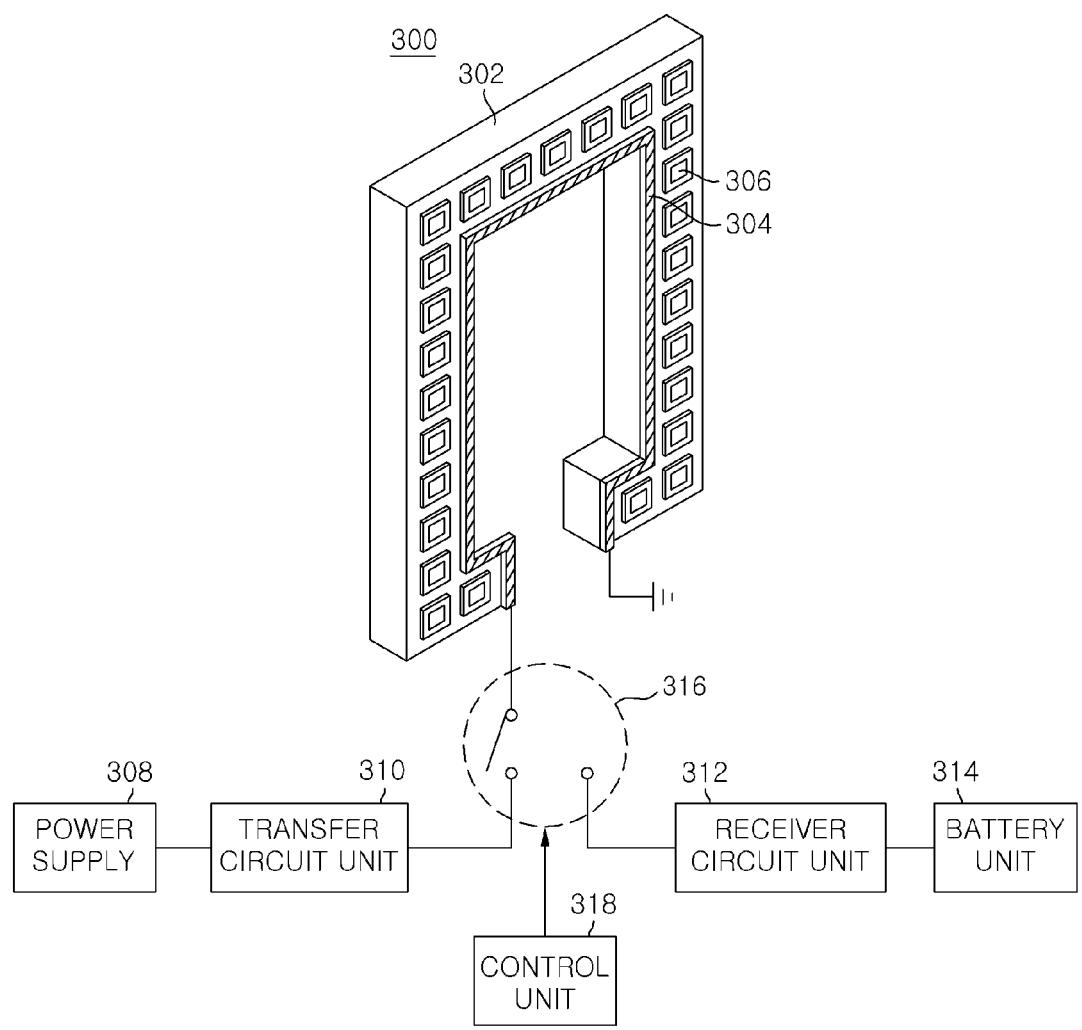
FIG. 12 illustrates an overall configuration diagram of a wireless power transceiver mobile device in accordance with an embodiment of the present invention.

FIG. 12 illustrates an overall configuration diagram of a wireless power transceiver mobile device in accordance with an embodiment of the present invention. The wireless power transceiver mobile device includes a transceiver resonator 300, a power supply unit 308, a transfer circuit unit 310, a receiver circuit unit 312, a battery unit 314, a switch unit 316, and a control unit 318.

The wireless power transceiver mobile device may be implemented by providing combined functions to transfer and receive the wireless power to a mobile device such as a smart-phone and selectively switching one of these functions.

As shown in FIG. 12, the wireless power transceiver resonator 300 couples to the power supply or a resonator of an external mobile device (not shown) to transfer and receive the power to and from the external mobile device. The transceiver resonator 300 includes an inverted U-shaped dielectric layer 302 whose distal ends are bent inward, a loop-shaped antenna 304 patterned in line with the inner shape of the dielectric layer 302, a meta-structure 306 that is arranged around the antenna on the dielectric layer 302 while enclosing the dielectric layer and reinforces any one of the electric fields and the magnetic fields that are formed in the transceiver resonator 300.

The meta-structure 306, which is applied to the embodiment of the present invention, is physically separated from the antenna 304, and may include one or more meta-pattern layers patterned on the dielectric layer 302, e.g., an array of unit cells with a DHMR structure. Further, it is characterized in that the meta-structure 106 has a Q factor of 100.

This meta-structure 306 has an effective dielectric constant $\in$ of a positive value and an effective permeability μ of a negative value, and in this condition, it is characterized in that the frequency band absorbed by the meta-structure 306 is different from the resonant frequency.

The power supply 308 serves to feed an electrical power to the wireless power transceiver mobile device.

The transfer circuit unit 310 may include a VCO (Voltage Controlled Oscillator) that changes a DC controlled voltage from the power supply 308 to control an output oscillation frequency and an amplifier that amplifies an AC signal controlled through the use of the VCO.

The amplifier includes, for example, an adaptive bias circuit, which in turn receives information on a charge state from the transceiver resonator 300 to stop charging the power.

The receiver circuit unit 312 may include a rectifier that rectifies the power received through the transceiver resonator 300 and a DC-DC converter that converts an input of a rectified DC voltage from the rectifier into an output of a DC voltage.

The battery unit 314 serves to charge a power converted through the DC-DC converter.

The switch unit 316 is configured to switch the transceiver resonator 300 between the transfer circuit unit 310 and the receiver circuit unit 312 under a control of the control unit 318.

More specifically, in a transfer mode of the wireless power transceiver mobile device, the switch unit 316 is switched into the transfer circuit unit 310 to allow the wireless power transceiver mobile device to wirelessly transfer the power. In a receiving mode of the wireless power transceiver mobile device, the switch unit 316 is switched into the receiver circuit unit 312 to allow the wireless power transceiver mobile device to wirelessly receive the power. It is understood that such switching modes may be made by the operation of a user interface implemented on the wireless power transceiver mobile device or may be automatically toggled with a signal to transfer or receive the power to the wireless power transceiver mobile device.

The control unit 318 plays a role to control the switching operation of the switch unit 316.

Further, the control unit 318 receives the charge state information from the receiver circuit unit 312 to stop charging the power. In other words, the control unit 318 monitors the charge state of the receiver circuit unit 312 and blocks the charging of the power in accordance with the charge state information.

As set forth above, in accordance with an embodiment of the present invention, the meta-structure is applied to the wireless power transceiver technique. Consequently, it allows the improvement of the Q factor of the wireless power transceiver, which results in reinforcing the electric fields or magnetic fields. Further, it secures the wireless power transfer efficiency of at least 80% in a 13.56 MHz frequency band used for the NFC and allows a size reduction of the wireless power transceiver mobile device.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A wireless power receiver comprising:
a receiver resonator configured to be coupled to a source resonator to receive a power from the source resonator, the receiver resonator comprising:
an inverted U-shaped dielectric layer whose distal ends are bent inward;
an antenna patterned in the form of a loop in line with the shape of the dielectric layer; and
a meta-structure arranged around the antenna on the dielectric layer, wherein the meta-structure is configured to reinforce at least one of an electric field and a magnetic field that are formed in the receiver resonator,
wherein the meta-structure comprises a plurality of unit cells with a DHMR (Double H-shape Meta-material Resonator) structure, and
wherein the meta-structure having the plurality of unit cells with the DHMR structure is configured to absorb a frequency band that is different from a resonant frequency of the receiver resonator.

2. The wireless power receiver of claim 1, wherein the meta-structure comprises one or more meta-pattern layers that are physically separated from the antenna.

3. The wireless power receiver of claim 1, wherein the meta-structure has a Q factor of 100.

4. A wireless power receiver comprising:
a receiver resonator configured to be coupled to a source resonator to receive a power from the source resonator, the receiver resonator comprising:
a first inverted U-shaped dielectric layer whose distal ends are bent inward;
an antenna patterned in the form of a loop in line with the shape of the first dielectric layer;
a first meta-structure arranged on the first dielectric layer around the antenna and configured to reinforce at least one of an electric field and a magnetic field that are formed in the receiver resonator;
a second inverted U-shaped dielectric layer located in the exterior of the first dielectric layer; and
a second meta-structure arranged on the second dielectric layer and configured to reinforce at least one of the electric field and the magnetic field that are formed in the receiver resonator,
wherein the first and second meta-structure comprises a plurality of unit cells with a DHMR (Double H-shape Meta-material Resonator) structure,
wherein the first and second meta-structure having the plurality of unit cells with the DHMR structure is configured to absorb a frequency band that is different from a resonant frequency of the receiver resonator.

5. The wireless power receiver of claim 4, wherein the second meta-structure is arranged on the same plane as the first meta-structure.

6. The wireless power receiver of claim 5, wherein the second meta-structure is configured to amplify any one of the electric field and the magnetic field that are formed in the receiver resonator.

7. The wireless power receiver of claim 4, wherein the second meta-structure is perpendicular to the first meta-structure.

8. The wireless power receiver of claim 7, wherein the second meta-structure is configured to focus any one of the electric field and the magnetic field that are formed in the receiver resonator.

9. A wireless power transfer comprising:
a source resonator configured to be coupled to a power supply, the source resonator comprising:
an inverted U-shaped planar dielectric layer whose distal ends are bent inward;
an antenna patterned in the form of a loop in line with the shape of the dielectric layer; and
a meta-structure arranged around the antenna on the dielectric layer and configured to reinforce at least one of an electric field and a magnetic field that are formed in the source resonator,
wherein the meta-structure comprises a plurality of unit cells with a DHMR (Double H-shape Meta-material Resonator) structure, and
wherein the meta-structure having the plurality of unit cells with the DHMR structure is configured to absorb a frequency band that is different from a resonant frequency of the source resonator.

10. The wireless power transfer of claim 9, further comprising:
a VCO (Voltage Controlled Oscillator) configured to change a DC voltage for a control from the power supply to control an output oscillation frequency; and
an amplifier configured to amplify an AC signal controlled by the VCO.

11. The wireless power transfer of claim 10, wherein the amplifier comprises an adaptive bias circuit.

12. The wireless power transfer of claim 11, wherein the adaptive bias circuit comprises means to receive information on a charge state from a receiver resonator to stop charging a power.

13. A wireless power transceiver device comprising:
a resonator configured to be coupled to a power supply or a resonator of an external wireless power transceiver device to transfer to and to receive from the external device a power, the resonator comprising:
an inverted U-shaped dielectric layer whose distal ends are bent inward;
an antenna patterned in the form of a loop in line with the shape of the dielectric layer; and
a meta-structure arranged around of the antenna on the dielectric layer and configured to reinforce at least one of an electric field and a magnetic field that are formed in the receiver resonator,
wherein the meta-structure comprises a plurality of unit cells with a DHMR (Double H-shape Meta-material Resonator) structure, and
wherein the meta-structure having the plurality of unit cells with the DHMR structure is configured to absorb a frequency band that is different from a resonant frequency of the resonator.

14. The wireless power transceiver device of claim 13, wherein the meta-structure is physically separated from the antenna and comprises at least one or more meta-pattern layers that are patterned on the inverted U-shaped dielectric layer around the antenna.

15. The wireless power transceiver device of claim 13, wherein the meta-structure has a Q factor of 100.

16. The wireless power transceiver device of claim 13, wherein the external wireless power transceiver device comprises:
a transceiver circuit unit configured to convert DC voltage from the power supply and amplify the converted DC voltage;
a receiver circuit unit configured to rectify the power received through the resonator;

a switch unit configured to selectively switch the transfer circuit unit or the receiver circuit unit into the resonator; and a control unit configured to control the switch unit, receive charge state information and stop charging the power.

17. The wireless power receiver of claim 1, wherein the meta-structure has an effective dielectric constant of a positive value and an effective permeability of a negative value, and wherein a frequency band absorbed by the meta-structure is different from a resonant frequency.

18. The wireless power transceiver device of claim 13, wherein the meta-structure has an effective dielectric constant of a positive value and an effective permeability of a negative value, and wherein a frequency band absorbed by the meta-structure is different from a resonant frequency.

19. The wireless power transceiver device of claim 1, wherein the plurality of unit cells with the DHMR structure of the meta-structure are patterned on the dielectric layer in an embossed or engraved form around the antenna.

* * * * *